United States Patent [19]

Wilson

[11] 3,863,349

[45] Feb. 4, 1975

[54] GAGING APPARATUS
[75] Inventor: David A. Wilson, Sheboygan, Wis.
[73] Assignee: Perry Industries, Inc., Hicksville, N.Y.
[22] Filed: June 11, 1973
[21] Appl. No.: 369,082

[52] U.S. Cl............ 33/169 R, 33/172 E, 33/174 L, 324/34 R, 209/73
[51] Int. Cl. ........................................... G01b 5/04
[58] Field of Search........... 33/169 R, 174 L, 172 E; 209/73, 80; 324/34 R, 41

[56] References Cited
UNITED STATES PATENTS
3,295,676   1/1967   Ochs.............................. 324/34 R Primary Examiner—Samuel B. Rothberg
Assistant Examiner—Willis Little
Attorney, Agent, or Firm—Koenig, Senniger, Powers and Leavitt

[57] ABSTRACT

Gaging apparatus in which workpieces to be gaged are continuously conveyed along a predetermined path, with an endless series of gage members movable along at least a portion of this path in unison with the workpieces. The gage members are brought into engagement with the workpieces as they travel along the stated portion of the path, and sensor actuators on the gage members pass by a proximity sensor with a gap between the sensor actuators and the sensor, the extent of the gap being determined by the workpiece. The sensor is responsive to the passage of each actuator to transmit a signal related to the extent of the gap between the actuator and the sensor, thereby to gage the gap and hence the workpiece.

12 Claims, 11 Drawing Figures

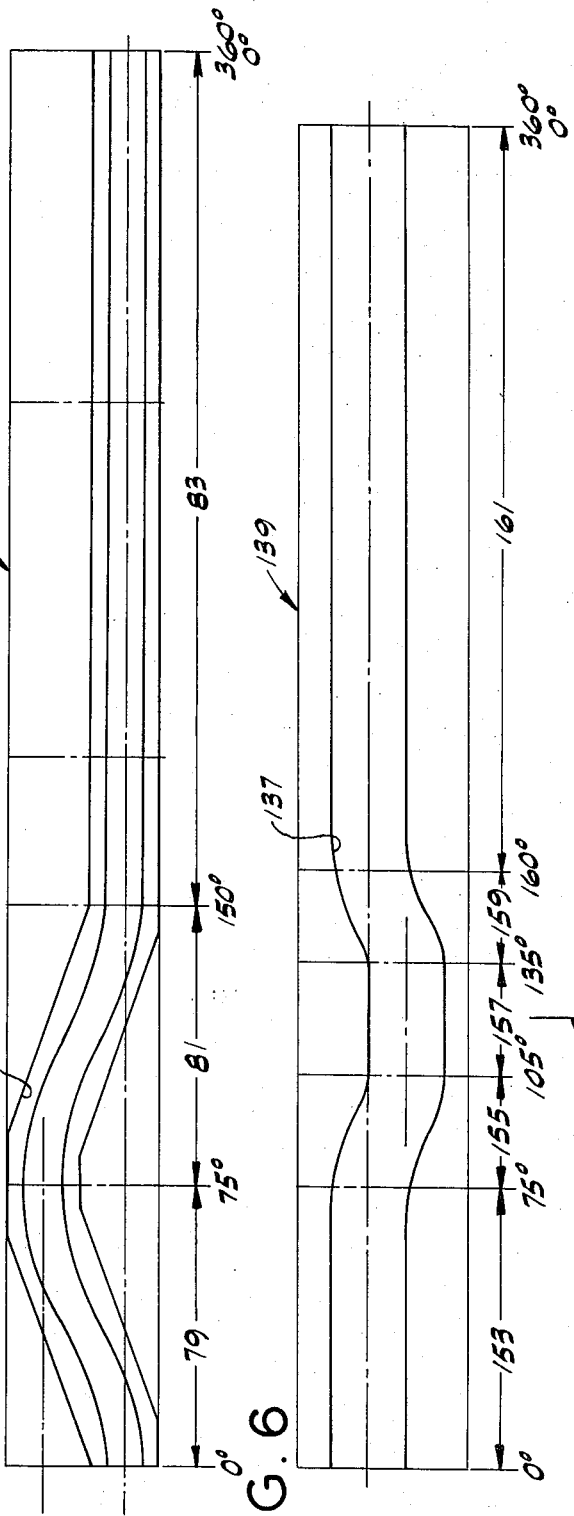
FIG. 5
FIG. 6
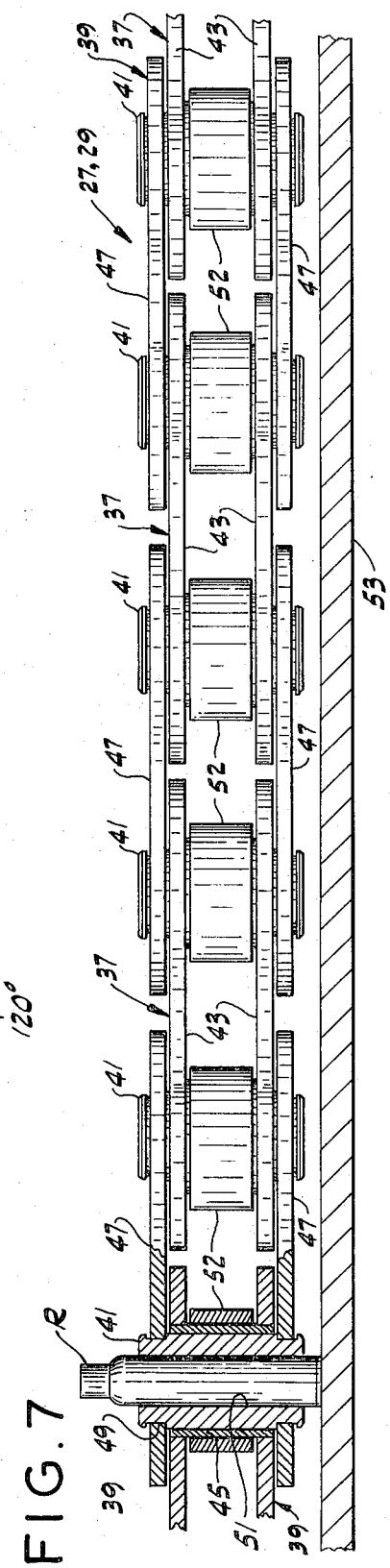
FIG. 7

GAGING APPARATUS

BACKGROUND OF THE INVENTION

This invention relates to gaging apparatus, and more particularly to apparatus for gaging various parameters of various workpieces via proximity sensing.

The invention is particularly concerned with gaging receptacles, in respect to such parameters as height (or length) of the receptacle, depth of fill of the receptacle (as with a powder), etc.

SUMMARY OF THE INVENTION

Among the several objects of the invention may be noted the provision of gaging apparatus of the class described adapted to perform various gaging operations on workpieces as the workpieces are conveyed at relatively high speed through equipment which carries out various work operations on the workpieces; the provision of such apparatus which has a stationary gaging component, and which carries out the high-speed gaging operations on the workpieces without physical contact between the workpieces being conveyed and the stationary component; and the provision of such apparatus particularly adapted for gaging receptacles (e.g., for gaging height or length of a receptacle, depth of fill of the receptacle, etc.) while the receptacles are conveyed at high speed through filling and closing apparatus.

In general, gaging apparatus of this invention comprises a proximity sensor mounted in fixed position at a gaging station, and means for continuously conveying units one after another through said station past the sensor with a gap between the units and the sensor. The sensor is responsive to passage of each unit in proximity to the sensor to gage the gap between the unit and the sensor.

Other objects and features of this invention will be in part apparent and in part pointed out hereinafter.

BRIEF DESCRIPTION OF THE DRAWINGS

FIGS. 5 and 6 are developed views of two cams of the apparatus;

FIG. 7 is a view showing details of a chain of the apparatus;

Corresponding reference characters indicate corresponding parts throughout the several views of the drawings.

DESCRIPTION OF THE PREFERRED EMBODIMENT

Figure 1:
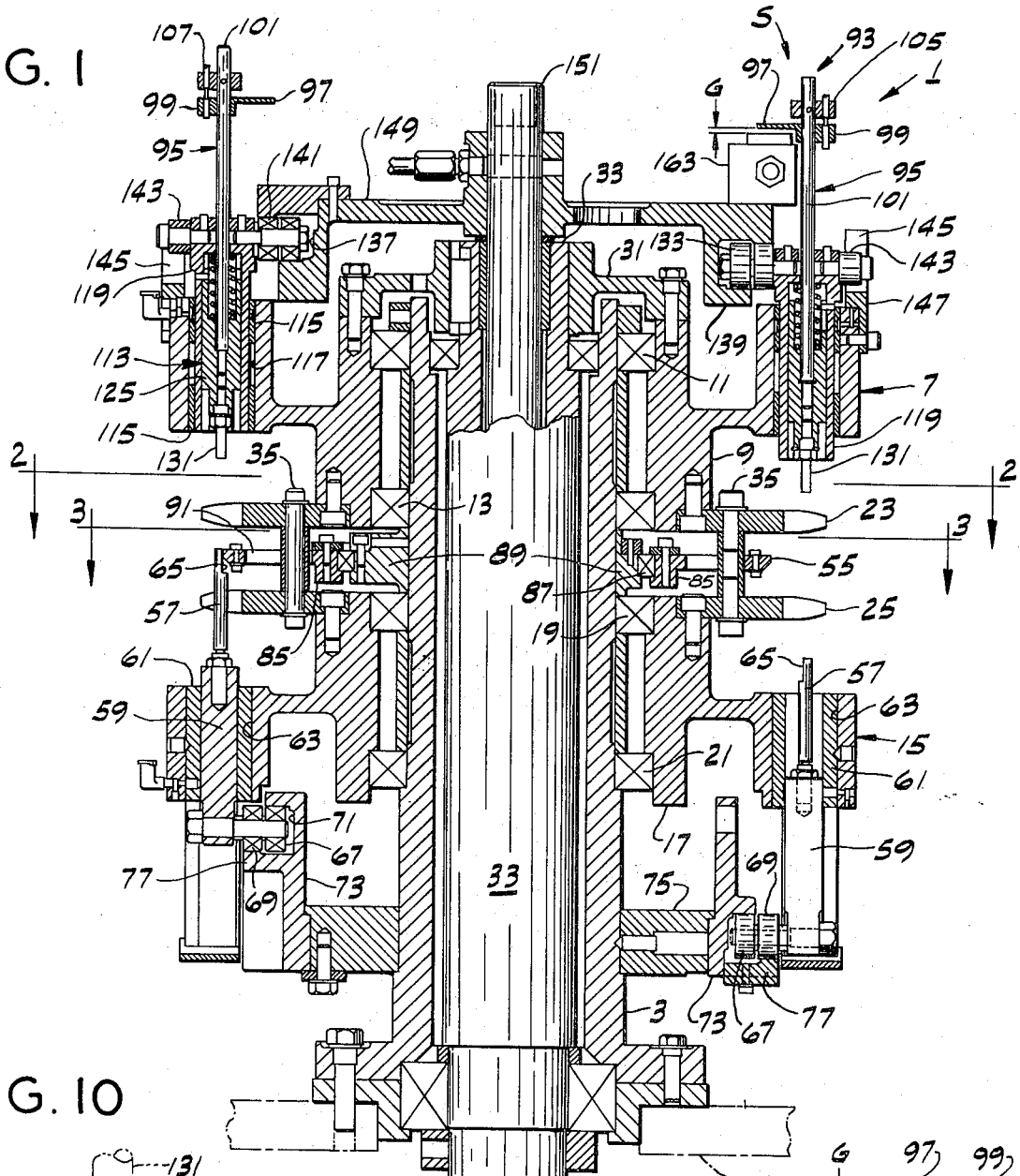
FIG. 1 is a vertical section of a gaging turret of apparatus of this invention, certain chains being omitted.

Referring to the drawings, there is generally indicated at 1 what may be referred to as a gaging turret of an apparatus of this invention for filling and closing receptacles R. These receptacles may be cartridge cases, for example, in which event the apparatus is one adapted to fill the cases with powder, insert bullets and crimp the cases. It will be understood, however, that the apparatus may be one for filling and closing other receptacles, for example, vials and capsules, and that the principles of the invention are applicable to gaging workpieces in general. The turret 1 embodies means of this invention for gaging the overall length of the receptacle to determine whether it is within acceptable limits (and also to determine if the mouth of a receptacle is damaged), and the principles of the invention are applicable to gaging other criteria, such as depth of fill.

The turret 1 comprises a fixed tubular post 3 extending vertically upward from a table indicated in phantom at 5 in FIG. 1. An upper wheel 7 has its hub 9 journalled for rotation on the post at its upper end by means of upper and lower bearings 11 and 13. A lower wheel 15 has its hub 17 journalled for rotation on the post below the upper wheel by means of upper and lower bearings 19 and 21. The hub 9 of the upper wheel 7 carries a sprocket 23 at its lower end, and the hub 17 of the lower wheel 15 carries a sprocket 25 at its upper end. An endless chain 27 constituting a workpiece delivery conveyor is trained around the lower sprocket 25. This serves as means for entering the receptacles or workpieces into the turret. An endless chain 29 constituting a workpiece forwarding conveyor is trained around the upper sprocket 23. The hub 9 of the upper wheel 7 has a head 31 on its upper end keyed to a tubular drive shaft 33 which extends up through the post 3. This shaft extends up above the upper end of the post and the hub 31 is keyed on the upper end of the shaft. Suitable drive means (not shown) is provided underneath the table 5 for driving the shaft 33. The lower sprocket 25 is pinned to the upper sprocket 23 by pins such as indicated at 35, the arrangement being such that on rotation of the drive shaft 33, the upper wheel 7 and sprocket 23 and the lower sprocket 25 and wheel 15 are rotated in unison around the vertical axis of the post, thereby driving both the lower and upper chains 27 and 29 in the direction of the arrows in FIG. 2. The two sprockets are identical and are pinned together with their teeth (and hence their notches between the teeth) in register.

Figure 2:
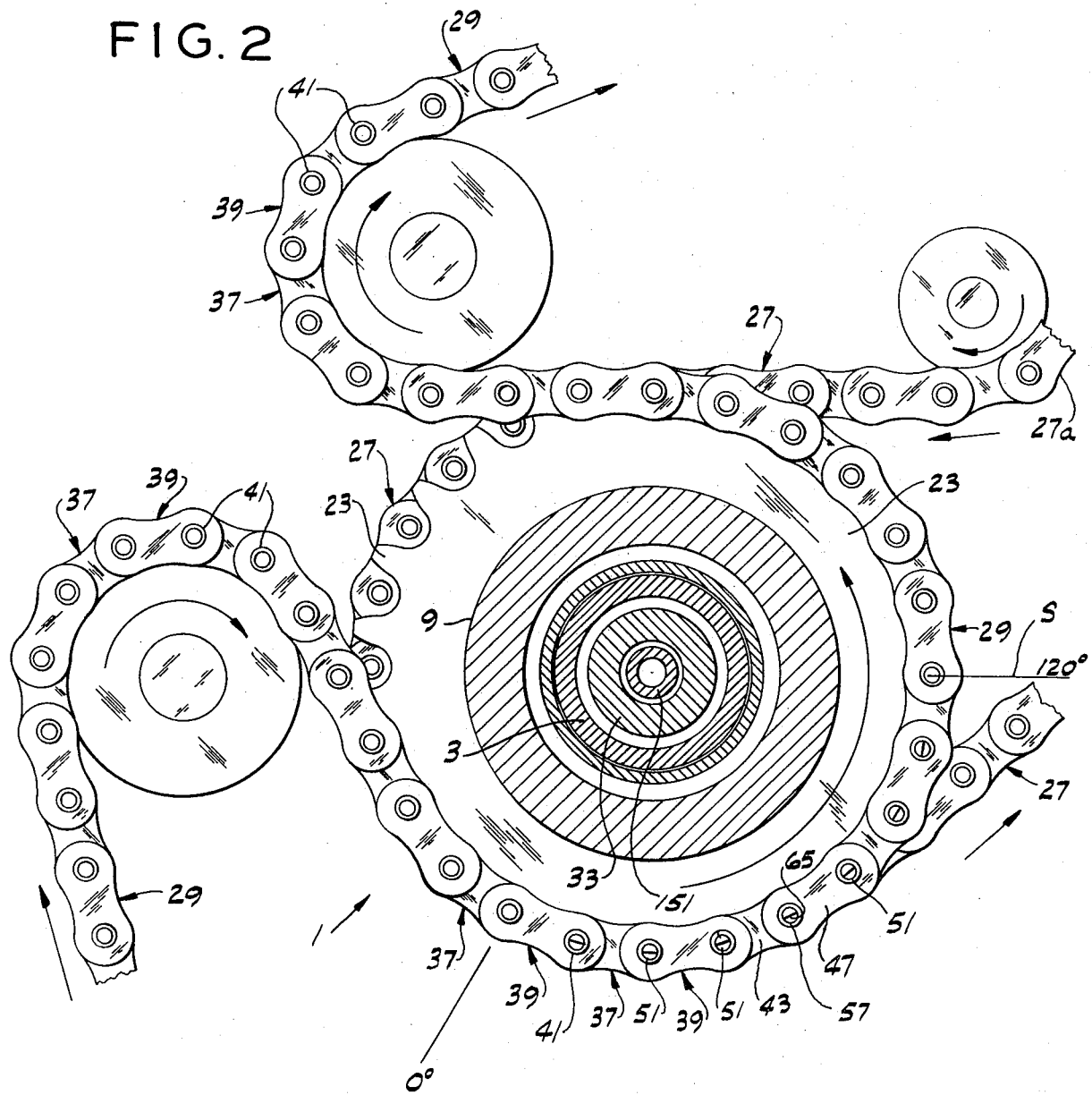
FIG. 2 is an enlarged horizontal section on line 2—2 of FIG. 1 with the addition of certain chain guides.

As shown in FIGS. 2 and 7, each of the chains 27 and 29 comprises links 37 alternating with links 39, each link being pin-connected at each end to the two adjacent links by a tubular pin 41. Each link 37 consists of two figure-eight-shaped bars 43 connected at their ends by tubular members 45 which receive the tubular pins, and each link 39 consists of two generally figure-eight-shaped bars 47 overlying the end portions of the links 37 and having openings 49 receiving the tubular pins 41, and being secured to the latter in suitable manner. The tubular pins 41 constitute means for holding the receptacles R (the workpieces), the bores 51 in the pins being dimensioned for a relatively free-sliding fit therein of the receptacles. The tubular members 45 carry rollers 52.

Receptacles R are entered into the turret 1 by the lower chain 27; generally, a receptacle is inserted in each tubular pin 41 of the reach 27a (see FIG. 2) of the lower chain travelling toward the turret 1, the receptacles being held up in the pins in suitable manner, as by a means of a suitable track 53 (see FIG. 7) over which the chain travels. After the receptacles have been brought into the turret by the lower chain they are lifted into the tubular pins 41 of the upper chain 29 and on to a positioning plate 55 by means of a circular series of vertical lift pins 57. Each of these lift pins is secured at its lower end to a plunger 59 vertically slidable in a bushing 61 in a vertical opening 63 in the lower wheel 15, and each lift pin at its upper end is cut away on its inside (i.e., on the side toward the post 3) as indicated at 65. The lift pins 57 are spaced at equal intervals around a circle centered in the axis of the wheel 15 (the vertical axis of the post 3), the interval corresponding to the spacing of the notches between the teeth of the two sprockets 23 and 25. The number of lift pins 57 corresponds to the number of notches in each sprocket, and the pins 57 are in register with the notches (and hence with the bores 51 in the tubular pins 41 of both chains). Each plunger 59 carries an inner cam follower roller 67 and an outer cam follower roller 69 at its lower end. The inner cam follower rollers 67 ride in a peripheral cam groove 71 in a fixed cylindrical cam 73 mounted on a collar 75 secured on the post 3 adjacent its lower end. The inner rollers 67 engage the top of the groove 71 and the outer rollers 69 ride on lower track 77.

Figure 10:
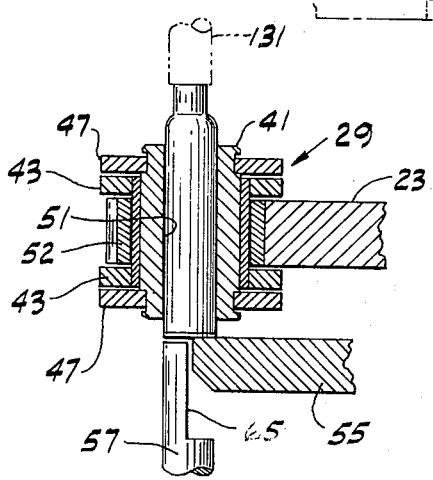
FIG. 10 is a detail section.
Figure 11:
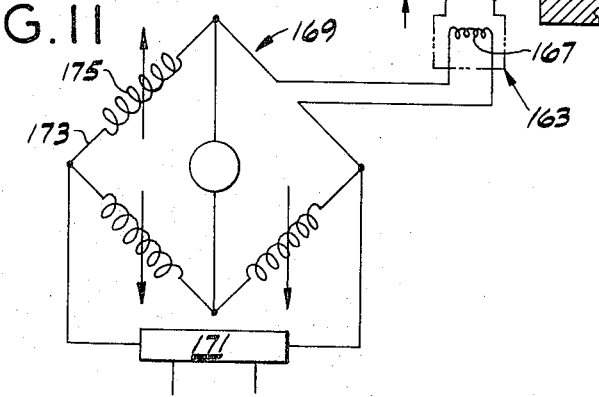
FIG. 11 is a wiring diagram.
Figure 3:
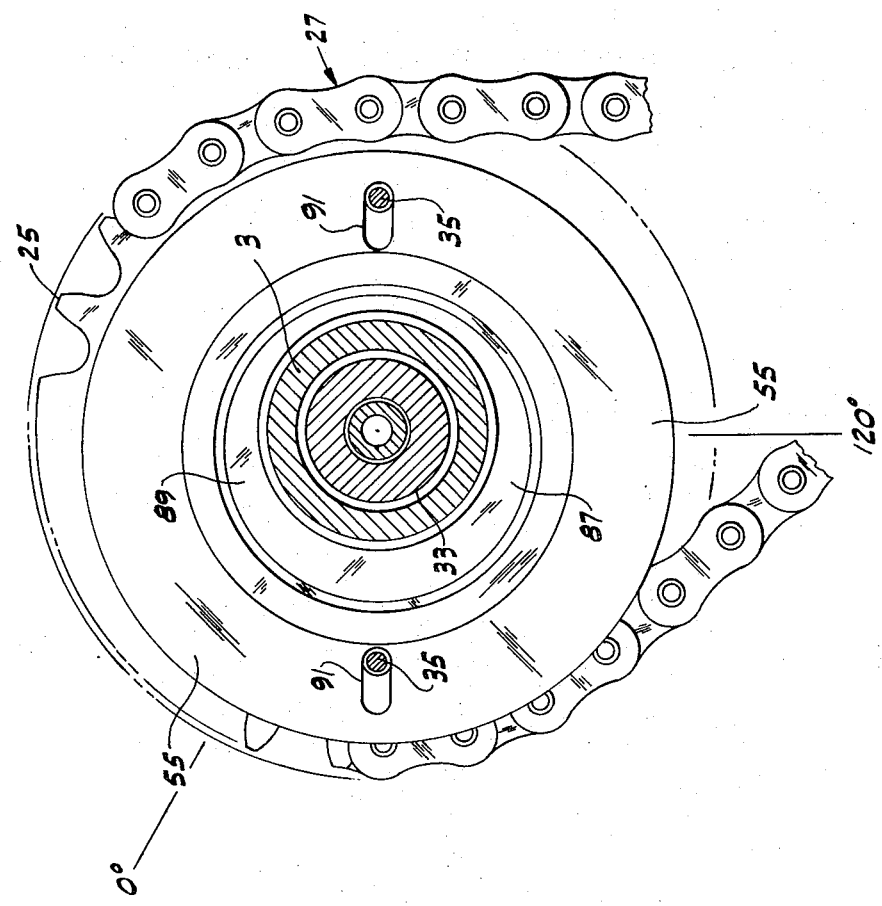
FIG. 3 is a horizontal section on line 3—3 of FIG. 1.
Figure 4:
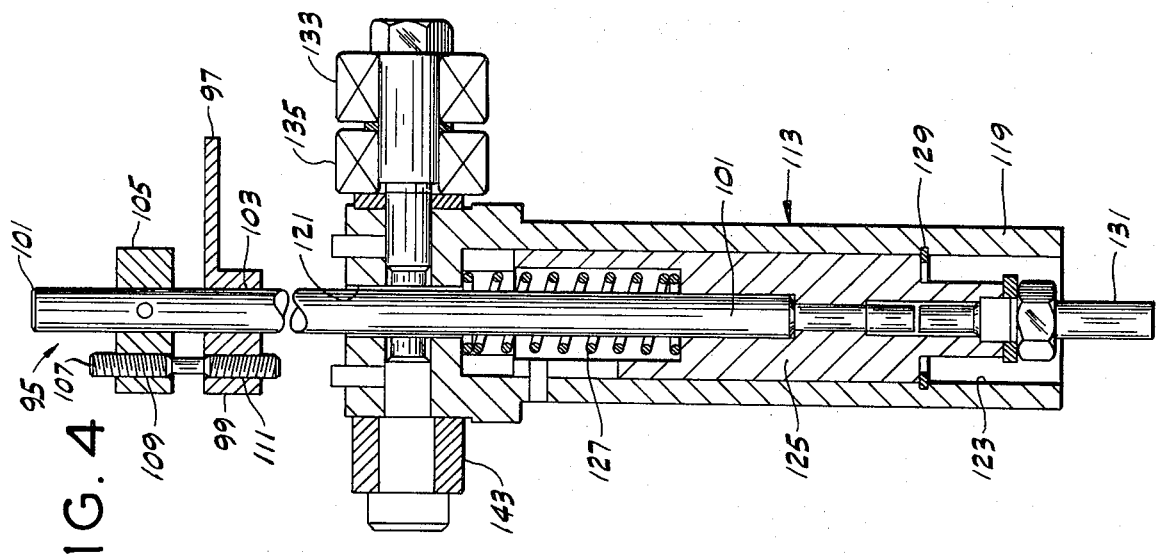
FIG. 4 is an enlarged fragment of FIG. 1 showing details of a gaging member of the apparatus.
Figure 8:
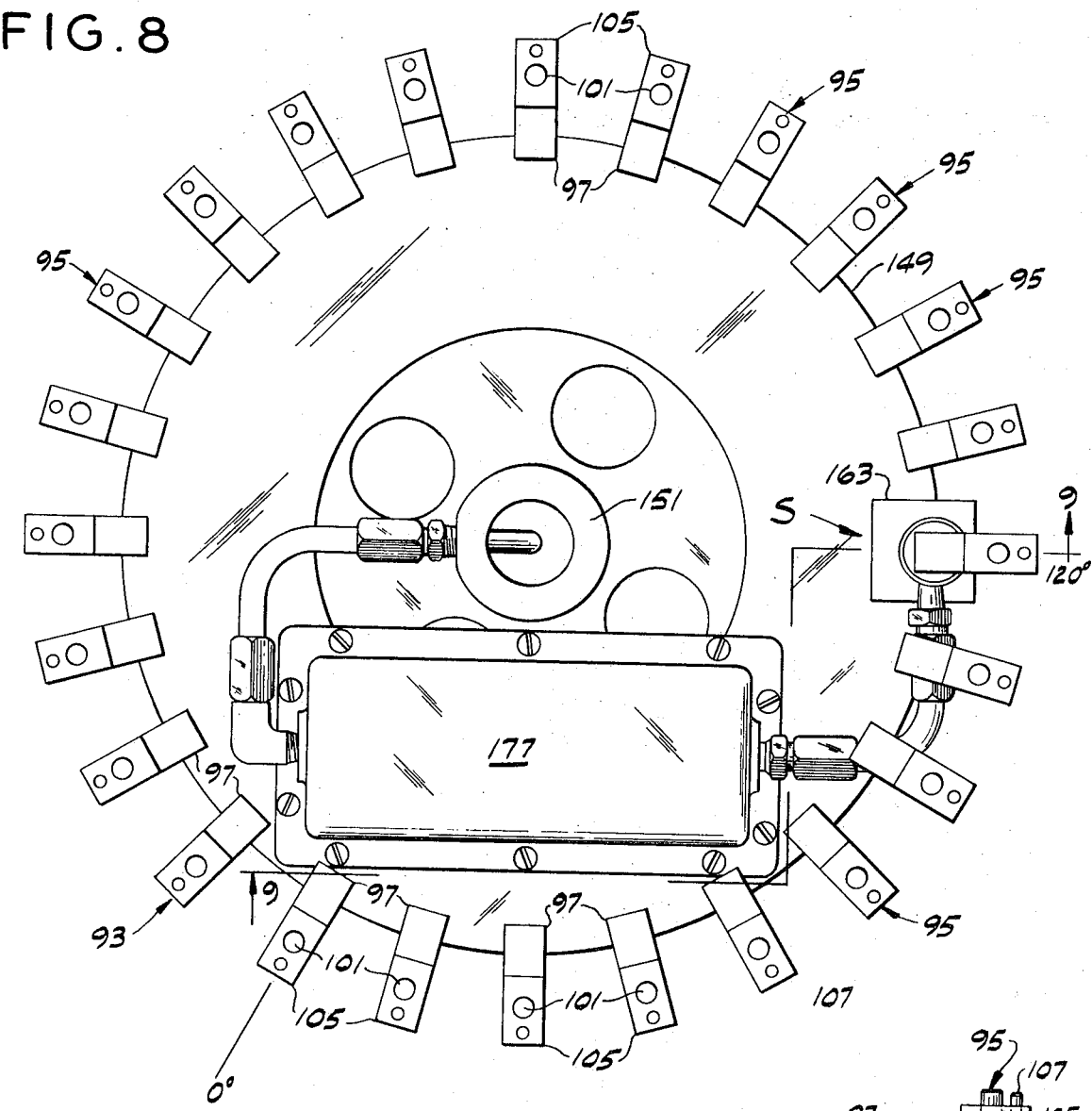
FIG. 8 is an enlarged plan of FIG. 1.
Figure 9:
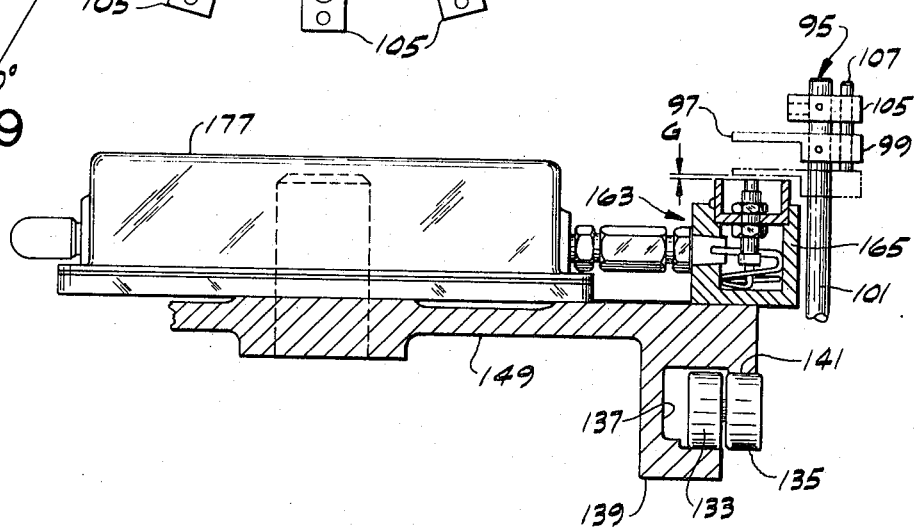
FIG. 9 is a vertical section generally on line 9—9 of FIG. 8.

The cam groove 71 (and cam track 77) are developed as illustrated in FIG. 5 to have a cycloidal rise 79 from a 0° position to the 75° position, a cycloidal drop 81 from 75° to 150°, and a horizontal dwell 83 from 150° back to 0°. It is phased (relative to the chains 27 and 29) with its 0° position as illustrated in FIG. 2 so that, as any given lift pin 57 comes around with the lower wheel 15 to the 0° position as illustrated in FIG. 2, the pin is lifted in the next 75° to its fully raised position (as illustrated for the pin 57 at the left of FIG. 1 and as detailed in FIG. 10), lowered in the next 75° to its fully lowered or downwardly retracted position (see the pin 57 at the right of FIG. 1), and remains in the latter position back around to the 0° position. The arrangement is such that each lift pin 57 comes around in its lowered position underneath the lower chain 27 and registers with the bore 51 in a tubular pin 41 of the lower chain 27 (which in turn registers with the bore 51 in a tubular pin 41 of the upper chain 29). The receptacle R in that bore comes off the track 53 which holds it up in the bore and rests at its lower end (which is its closed end) on the upper end of the lift pin 57. The lift pin then rises, lifting the receptacle into the bore 51 of the registering tubular pin 41 of the upper chain 29 and raising the receptacle to the point where its bottom is just above the level of the top of the positioning plate 55. The upper chain 29 then carries the receptacle forward with the receptacle held up on top of the lift pin and with part of the bottom of the receptacle overhanging the upper end of the lift pin at the cutaway 65. This part of the bottom of the receptacle comes onto the positioning plate 55 as illustrated in FIG. 10, and, at this point, the lift pin starts moving downwardly, leaving the receptacle held up by the positioning plate in the bore 51 of the tubular pin 41 of the upper chain 29. The receptacle then travels around the axis of the post 3 through part of a circle as determined by the wrap of the upper chain 29 around the upper sprocket 23 with the bottom of the receptacle bearing on the upper face of the positioning plate 55 at its periphery, this plate functioning in effect as a bottom gage member or datum reference as will appear. The positioning plate 55 is a circular plate having a concentric hub 85 journalled by means of a bearing 87 for rotation around an eccentric 89 fixed on the post 3 between the bearings 13 and 19. The sprocket-connecting pins 35 extend through slots 91 in the plate 55 and rotate it around the axis of eccentric 89 in unison with the sprockets 23 and 25. The center of the eccentric is offset from the vertical axis of post 3 (and sprockets 23 and 25 as shown in FIG. 3) so that the plate 55 is clear of the lift pins generally at the 0° position and around to the 75° position.

At 93 is indicated a circular series of gage members each designated 95 rotatable with the upper wheel 7 around the vertical axis of the post 3. Each of these gage members comprises a relatively thin rectangular tongue 97, which may be referred to as a "flag" or an "armature" extending from a block 99, the tongue and block being formed in one piece as herein illustrated. The one-piece armature and block member is preferably formed of steel or other ferromagnetic material, although it appears it could be formed of other material such as aluminum. Each armature is mounted on a vertical gage rod 101 for vertical adjustment on the rod, the block for the armature having an opening 103 receiving the rod with a sliding fit of the block on the rod, a head 105 being pinned on the upper end of the rod, and a differential adjustment screw 107 being threaded in tapped holes 109 and 111 in the head and block for vernier adjustment of the armature 97 up and down on the rod 101. Each of the gage rods 101 is carried by a plunger 113 vertically slidable in bushings 115 in a vertical opening 117 in the upper wheel. The number of gage rods 101 equals the number of lift pins 57, and each gage rod is coaxial with a respective lift pin (and the bore 51 of a tubular pin 41 of the upper chain 29). The plunger 113 comprises an elongate cylindric outer body 119 (which is vertically slidable in the bushings 115) having a bore 121 at its upper end and a counterbore 123 extending up from its lower end. A head 125 is vertically slidable in the counterbore, biased downwardly by a spring 127 against a stop 129 in the counterbore. The rod 101 extends slidably through the bore 121 and has its lower end suitably secured in the head 125. A gage pin 131 extends downwardly out of the counterbore 123 in plunger body 119 from the head 125 in extension of the gage rod 101. The plunger body 119 carries an inner cam follower roller 133 and an outer cam follower roller 135 at its upper end on the side of the body toward the center post 3. The inner cam follower roller 133 of each plunger rides in a peripheral cam groove 137 in a fixed cylindrical cam 139. The outer cam follower roller 135 of each plunger rolls against an overhead track 141 outside the top of the groove. Each plunger body 119 also carries an outer roller 143 at the top vertically movable in a vertical guide slot 145 in an upstanding ring 147 at the extreme periphery of the upper wheel 7 for holding the plunger body 119 against rotation on its axis while permitting it to move up and down.

The number of gage rods 101 )and gage pins 131) corresponds to the number of lift pins 57, and the gage rods 101 and pins 131 are in register with the lift pins and with the bores 51 in the tubular pins 41 of the upper chain 29 as it travels around with the upper sprocket 23. The fixed cylindrical cam 139 is at the periphery of a circular table plate 149 mounted on the upper end of a tubular post 151 which extends up through the tubular drive shaft 33 and projects out of the upper end of the latter. The cam groove 137 (and cam track 141) of cam 139 are developed as illustrated in FIG. 6 to have a horizontal dwell 153 from a 0° position to the 75° position, a cycloidal drop 155 from the 75° position to the 105° position, a horizontal dwell 157 from the 105° position to the 135° position, a cycloidal rise 159 from the 135° position to the 160° position back to the level of the dwell 153, and then a horizontal dwell 161 back to the 0° position. It is phased with its 0° position coincident with the 0° position of cam 73. Thus, starting at the 75° position, each gage rod 101 and pin 131 are lowered down toward a receptacle R being carried around on the positioning plate 55 by the upper chain 29, stays down to the 135° position, is then raised in travelling from the 135° to the 160° position, and remains raised until it comes around again to the 75° position.

Mounted on the table plate 149 generally at the 120° position is a proximity sensor 163 (see FIGS. 1, 8, 9 and 11). This 120° position constitutes a gaging station S. The proximity sensor comprises a case 165 housing an inductive coil 167 connected in one branch of a Wheatstone type bridge circuit 169. A detector/amplifier 171 connected across the output of the bridge circuit amplifies the bridge circuit output, which is a function of the gap G between an armature 97 and the sensor 163 as the armature passes by the sensor. The bridge has a balancing arm 173 including an adjustable impedance 175 for initial calibration of the bridge, which is activated by a suitable carrier. Wiring from the sensor leads to a box 177 on the plate 149, and wiring from the box leads down through the tubular post 151.

In operation, the receptacles R (constituting workpieces to be gaged), are entered into the turret 1 via the delivery chain 27, being carried into the turret in the bores 51 of tubular pins 41 of this chain in erect position. When each receptacle reaches the 0° position, and as it proceeds to the 75° position, it is pushed up out of the pin 41 of chain 27 by a lift pin 57, the latter being raised via the rise 79 of cam 73. The receptacle is pushed up into the bore 51 of the tubular pin 41 of the upper chain 29 which is in register with the stated pin 41 of the lower chain 27, to the point where the bottom of the receptacle is just above the level of the upper face of the positioning plate 55 (see FIG. 10). The lift occurs in an arcuate zone outward of the periphery of the plate 55 (at its right as viewed in FIG. 3), the plate 55 being eccentrically mounted and so phased for this purpose. After the receptacle has been fully raised, it continues its forward movement within the pin 41 of chain 29, resting momentarily on the tip of the respective lift pin 57 until, in view of the cutaway 65 of the lift pin, the bottom of the receptacle comes onto the plate 55. Then the lift pin, in travelling around from the 75° position to the 150° position is lowered, and the receptacle continues onward, bearing at its bottom on the plate 55.

The plate 55 thus serves as a bottom backup or support for the receptacle now lodged in the respective pin 41 of the upper chain 29, and constitutes means for establishing a datum reference for the receptacle as it passes through the gaging station S (at the 120° position) to enable an accurate gaging operation on the receptacle. As each gage member 95 travels around from the 75° position to the 105° position, it is positively moved downwardly via the drop 155 of the cylindrical cam 139 to the point where the lower end of the gage rod extension or pin 131 engages the upper end of the receptacle (see the position of pin 131 shown in phantom in FIG. 10), the assembly of pin 131, head 125 and rod 101 yielding upwardly away from stop 129 relative to the gage plunger body 119 against the downward bias of spring 127. This positions the gage rod 101 and the armature 97 on the rod 101 at a gage elevation relative to the positioning or datum reference plate 55 determined by the height (or length) of the receptacle R.

The engagement of the gage pin 131 with the upper end of the receptacle occurs at about the 105° position just before the receptacle and the respective gage member 95 reach the gaging station S (at the 120° position). As the receptacle and gage member sweep through the gaging station, the armature 97 on rod 101 of the gage member passes over the proximity sensor 163 at the gaging station S with a gap G (see FIGS. 1, 9 and 11) between the armature and the sensor. The extent (i.e., the heightwise dimension) of this gap G is a function of the height (or length) of the receptacle R. The sensor is responsive to the passage thereover of the armature in proximity to the sensor to gage the gap between the armature and the sensor, as a measure of the height (length) of the receptacle. This response is via the effect of the armature on the sensor coil 167 to vary its impedance, with resultant variation in the output of the bridge 169. The output is detected and amplified by the detector/amplifier 171 and the amplified output is read out as a measure of the height (length) of the receptacle or as a measure of the variation of the height (length) of the receptacle from a predetermined standard. The readout may be utilized in suitable manner to effect ejection of any receptacle which is outside tolerance limits.

The principles of the invention may be utilized for gaging other parameters than the height of the workpiece. For example, by having the pins 131 enter the receptacles and engage a fill of powder or the like in the receptacles, the depth of fill may be gaged. If the pins 131 are made tapered for wedge entry into the mouth of a receptacle, they will not only gage the height but will also determine if the mouth is damaged.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Gaging apparatus comprising a proximity sensor mounted in fixed position at a gaging station, means for continuously conveying units one after another through said station past the sensor with a gap between the units and the sensor, said sensor being responsive to passage of each unit in proximity to the sensor to gage the gap between the unit and the sensor, and means for continuously conveying workpieces to be gaged one after another in a predetermined path through said station, wherein said units are gage members and said means for conveying the latter comprises an endless conveyor carrying said gage members and means for moving said gage member conveyor in an endless path at least part of which parallels the path of the workpiece conveyor through the gaging station with the gage members contacting the workpieces as they pass through the gaging station, said gaging members carrying means for passage in proximity to the sensor.

2. Apparatus as set forth in claim 1 having means backing the workpieces and constituting a datum reference for the workpieces as they pass through the gaging station for gaging the gap in relation to the datum reference.

3. Apparatus as set forth in claim 1 wherein said gage members are carried by the gage member conveyor for movement from a retracted position into engagement with the workpieces, and wherein means is provided for moving the gage members into engagement with the workpieces as they pass through the gaging station and then retracting the gage members.

4. Apparatus as set forth in claim 3 wherein the gage member conveyor comprises a wheel rotatable on a vertical axis, the gage members being arranged in a circular series around the wheel, the workpiece conveyor conveying the workpieces in a part-circular path through the gaging station below the circle of the gage members, and the gage members being movable downward relative to the wheel into engagement with workpieces travelling therebelow as they pass through the gaging station and then upward to retracted position.

5. Gaging apparatus as set forth in claim 4 wherein the sensor is mounted in fixed position above the wheel at the gaging station, and the said proximity means on each gage member comprises an armature on the gage member adapted to pass over the sensor with said gap therebetween.

6. Gaging apparatus as set forth in claim 5 wherein the workpiece conveyor comprises an endless chain having links connected by tubular pins, the workpieces being received in the pins, the chain being trained around a sprocket coaxial with and below the wheel and rotary with the wheel, and the apparatus having means for supporting the workpieces at the bottom as they travel around with the chain through the gaging station establishing a datum reference for the gaging of the gap.

7. Gaging apparatus as set forth in claim 6 having means for entering workpieces in the tubular pins of said chain.

8. Gaging apparatus as set forth in claim 7 wherein said entering means inserts the workpieces into the pins through the lower ends of the pins, the workpieces being then supported by said datum reference supporting means.

9. Gaging apparatus as set forth in claim 8 wherein said entering means comprises an endless delivery chain having links connected by tubular pins, the workpieces being received in these pins, the said delivery chain being trained around a second sprocket coaxial with and below the first-mentioned sprocket and rotary with the latter, a second wheel rotary with the second sprocket and below the latter, a circular series of lift pins carried by the second wheel, and means for moving the lift pins to push workpieces upwardly out of the pins of the delivery chain into the pins of the workpiece conveyor chain thereabove.

10. Gaging apparatus as set forth in claim 9 wherein said datum reference supporting means comprises a circular plate rotatable with the sprockets between the sprockets and eccentrically mounted with respect to the axis of the sprockets.

11. Gaging apparatus as set forth in claim 5 wherein the means for moving the gage members up and down comprises a fixed cylindrical cam at the periphery of a circular plate mounted in fixed position above said wheel, the sensor being mounted on this plate at the gaging station.

12. Gaging apparatus as set forth in claim 11 wherein each gage member is carried by a holder movable up and down by the cam, and spring means is provided between the holder and the gage member.

* * * * *

PO-1050
(5/69)

UNITED STATES PATENT OFFICE
CERTIFICATE OF CORRECTION

Patent No. 3,863,349    Dated February 4, 1975

Inventor(s)    David A. Wilson

It is certified that error appears in the above-identified patent and that said Letters Patent are hereby corrected as shown below:

Column 1, line 7, after the period the following should be inserted -- The invention herein described was made in the course of or under a contract or subcontract thereunder (or grant) with the Department of the Army. --

Signed and sealed this 8th day of April 1975.

(SEAL)
Attest:

RUTH C. MASON
Attesting Officer

C. MARSHALL DANN
Commissioner of Patents
and Trademarks